United States Patent
Huang et al.

(10) Patent No.: US 7,064,465 B2
(45) Date of Patent: Jun. 20, 2006

(54) MOTOR

(75) Inventors: Shih-Ming Huang, Taoyuan Hsien (TW); Lee-Long Chen, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/994,471

(22) Filed: Nov. 23, 2004

(65) Prior Publication Data

US 2006/0006753 A1    Jan. 12, 2006

(30) Foreign Application Priority Data

Jul. 9, 2004    (TW)    ................ 93120590 A

(51) Int. Cl.
*H02K 1/27* (2006.01)
*H02K 21/12* (2006.01)

(52) U.S. Cl. .................. 310/156.43; 310/156.74; 310/156.76

(58) Field of Classification Search ........... 310/156.01, 310/156.02, 156.43, 156.74–156.77, 68 B, 310/156.05–156.07, 51; 360/97.04, 98.07, 360/99.08

See application file for complete search history.

(56) References Cited

U.S. PATENT DOCUMENTS

| 2,672,564 | A | * | 3/1954 | Krasno | 310/46 |
| 3,495,113 | A | * | 2/1970 | Haydon | 310/164 |
| 4,417,186 | A | * | 11/1983 | Hirose et al. | 318/254 |
| 4,529,918 | A | * | 7/1985 | Muller | 318/254 |
| 5,089,733 | A | * | 2/1992 | Fukuoka | 310/67 R |
| 5,408,153 | A | * | 4/1995 | Imai et al. | 310/68 B |
| 5,831,359 | A | * | 11/1998 | Jeske | 310/68 B |
| 5,952,760 | A | * | 9/1999 | Miyazawa et al. | 310/194 |
| 6,844,647 | B1 | * | 1/2005 | Horber | 310/156.43 |

FOREIGN PATENT DOCUMENTS

| JP | 361076056 | * | 9/1984 | 310/156.75 |
| JP | 361039842 | * | 2/1986 | 310/156.74 |
| JP | 62-17661 | * | 1/1987 | 310/156.06 |
| JP | 62-236349 | * | 10/1987 | 310/156.06 |
| JP | 8-242569 | * | 9/1996 | 310/156.06 |

* cited by examiner

*Primary Examiner*—Tran Nguyen
(74) *Attorney, Agent, or Firm*—Birch, Stewart, Kolasch & Birch, LLP

(57) ABSTRACT

Motors for fans are provided. The motor includes a stator and a rotor. The stator includes a plurality of magnetic poles. The rotor is coupled to the stator and includes a magnetic structure with a plurality of magnetic poles. Each magnetic pole has an interpolar portion. A uniform gap is formed between the stator and the magnetic structure.

19 Claims, 7 Drawing Sheets

MOTOR

BACKGROUND

The invention relates to a motor and in particular to a motor for a fan.

Motors for driving fans via magnetic torque generated therebetween are the currently prevailing model. The motor comprises a rotor and a stator. Either the rotor or the stator is a permanent magnet; the other is an electromagnet. The electromagnet is formed by applying power on windings to generate magnetic field, repelling the magnetic field of the permanent magnet. The repellant torque therebetween, however, must be as large as possible to drive the rotor. A popular solution is to enhance the output power of the motor, by increasing the amount or the outer diameter of the silicon steel plate or increasing the winding wound on the silicon steel plate for example.

FIG. 1A shows a conventional four-pole motor. To ensure that a rotor 12 can be activated without causing a dead angle situation or inability start, an asymmetric arc or r-angle 111 is formed on a magnetic pole of a silicon steel plate of a stator 11, or a stator 11 is designed with reluctance unbalanced. A winding 13 is wound around the stacked silicon steel plate. The rotor 12 is a symmetrical ring structure with equal magnetization and further comprises a metal shell 121 and a permanent magnet 122. A magnetizing method for the permanent magnet 122 of the rotor 12 is shown in FIG. 1B, set as N-S-N-S. A distance of gap 14 between the stator 11 and the rotor 12 is changed or non-uniform (as shown in FIG. 1A) to generate reluctance torque forcing the rotor 12 to shift its balanced position, such that the rotor 12 can start smoothly, and thus drive the motor.

However, the mentioned motor alleviates the start difficulty problem but increases torque ripple during operation and further produces vibration and noise problems. Further, the stator includes a plurality of silicon steel plates with the same shape. Some of which are modified to form an asymmetrical arc or r-angle thereon, thereby increasing the process difficulty and cost, and the torque ripple of the motor is difficult to eliminate. Further, the gap between the stator and rotor is large, causing greater loss of the magnetic circuit and magnetic flux.

SUMMARY

Motors are provided. An exemplary embodiment of a motor comprises a stator and a rotor. The stator comprises a plurality of magnetic poles. The rotor is coupled to the stator and comprises a magnetic structure. An equidistant gap is formed between the stator and the magnetic structure.

In some embodiments, the magnetic structure may comprise a plurality of magnetic regions, each magnetic region comprises an interpolar portion for easily starting the motor.

In some embodiments, the magnetic region may be counter magnetized with respect to the interpolar portion therein.

In some embodiments, the interpolar portion may be non-magnetizing or cavity portion.

In some embodiments, the shape of the interpolar portion may be shaped as rectangular, triangular, circular or any other profile.

In some embodiments, the motor may further comprise a Hall sensor detecting the phase change of the magnetic poles. The interpolar portion is located on a side of the magnetic structure corresponding to an induction surface opposite to the Hall sensor positioned on the other side of the magnetic structure. Further, the interpolar portion may be located at outer corner of the magnetic structure.

In some embodiments, the motor may further comprise a winding. The stator may further comprise a plurality of stacked silicon steel plates with symmetrical magnetic poles, and the winding is wound on the magnetic poles of the stacked silicon steel plates.

In some embodiments, the motor may further comprise a winding base. The stator may further comprise an upper stator part and a lower stator part coupled with the upper stator part for allowing the winding base to be sandwiched therebetween. Furthermore, the upper and lower stator parts may be integrally formed by injection molding or pressing, and the magnetic poles are formed on the upper and lower stator parts.

In some embodiments, the rotor may further comprise a shell and a shaft and the magnetic structure is disposed in the shell.

In some embodiments, the magnetic structure may be a cylindrical magnet or magnetic ring.

Another exemplary embodiment of a motor comprises a stator and a rotor. The rotor is coupled to the stator and comprises a magnetic structure with a plurality of magnetic regions and a plurality of interpolar portions.

In some embodiments, the magnetic regions and the interpolar portions may be counter magnetized.

In some embodiments, the interpolar portions may be non-magnetizing or cavity portions.

In some embodiments, the shape of the interpolar portions may be rectangular, triangular, circular or any other profile.

In some embodiments, the motor may further comprise a Hall sensor detecting the phase change of magnetic poles of the motor. The interpolar portions and the Hall sensor may be disposed on the opposite side of the magnetic structure.

In some embodiments, the interpolar portions may be located at outer corner of the magnetic structure.

In some embodiments, the motor may further comprise a winding. The stator may further comprise a plurality of stacked silicon steel plates with symmetrical magnetic poles, and the winding is wound on the magnetic poles of the stacked silicon steel plates.

In some embodiments, the motor may further comprise a winding base. The stator may further comprise an upper stator part and a lower stator part coupled to the upper stator part for enabling the winding base to be sandwiched therebetween. Furthermore, the upper and lower stator parts may be integrally formed by injection molding or pressing, and magnetic poles are formed on the upper and lower stator parts.

In some embodiments, a uniform gap is formed between the stator and the magnetic structure.

DETAILED DESCRIPTION

Figure 1A:
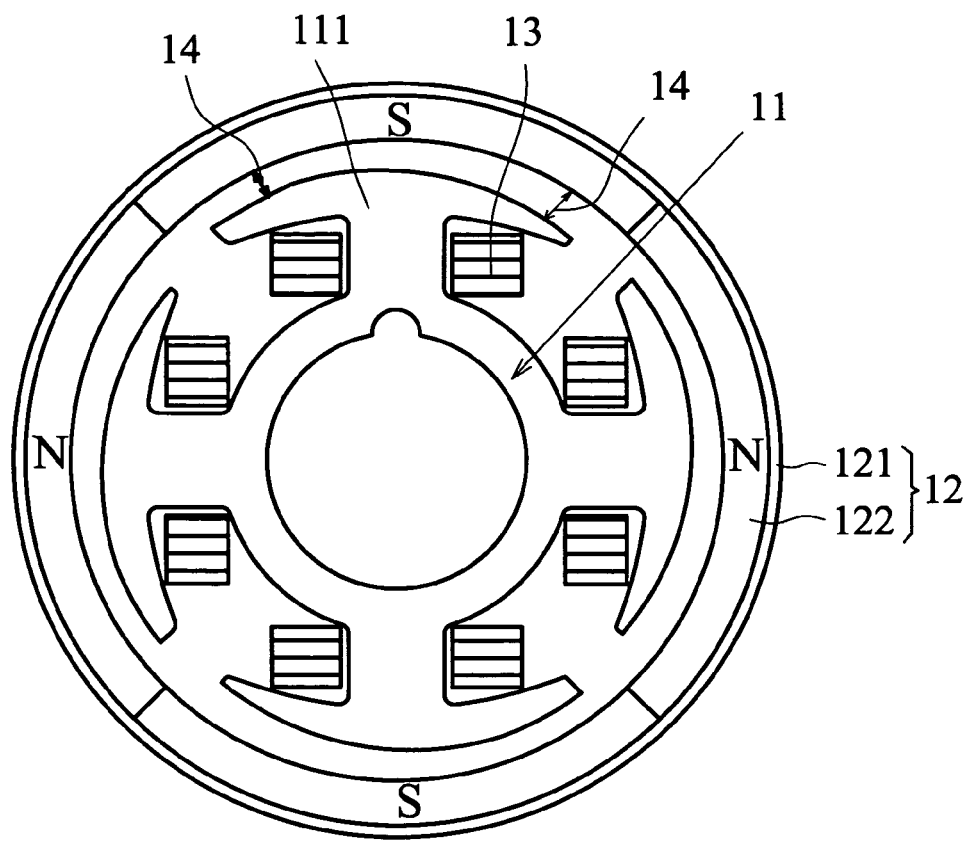
FIG. 1A is a sectional view of a conventional motor.
Figure 1B:
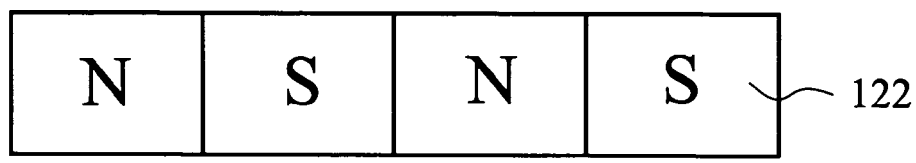
FIG. 1B is a schematic view of magnetic distribution of a permanent magnet of the motor according to FIG. 1A.

FIGS. 2A to 2D show a first embodiment of a motor, which can be used in a fan. As shown in FIGS. 2A to 2D, the motor comprises a rotor 21, a stator 22 comprising an upper stator part 221 and a lower stator part 221, a winding base 23, a sleeve 24, and a printed circuit board 25. A Hall sensor 26 is disposed on the printed circuit board 25 to detect the phase change of magnetic poles of the motor. The rotor 21 comprises a shell 211 such as an iron shell, a magnetic structure 212 and a shaft 213. When assembled, the magnetic poles 221a and 221b of the upper stator part 221 are interposed between and coupled with the magnetic poles 222a and 222b of the lower stator part 221. A winding 231 wound on a winding base 23 is sandwiched between the upper stator part 221 and the lower stator part 222, and the assembled elements are telescoped onto the sleeve 24. The sleeve 24 is made of soft-magnetic material such as iron or silicon steel.

Figure 2A:
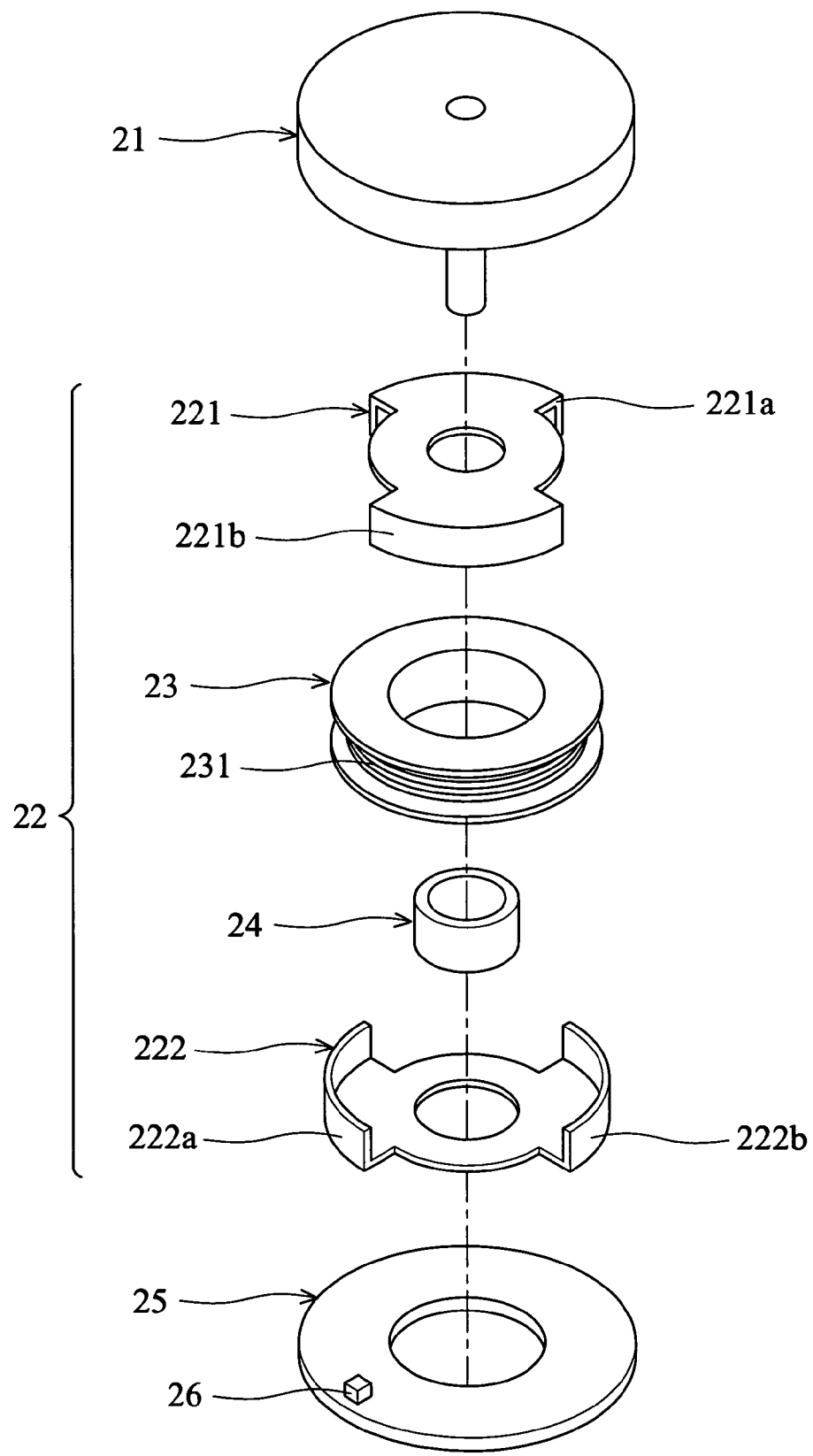
FIG. 2A is an exploded view of a motor of the first embodiment.
Figure 2B:
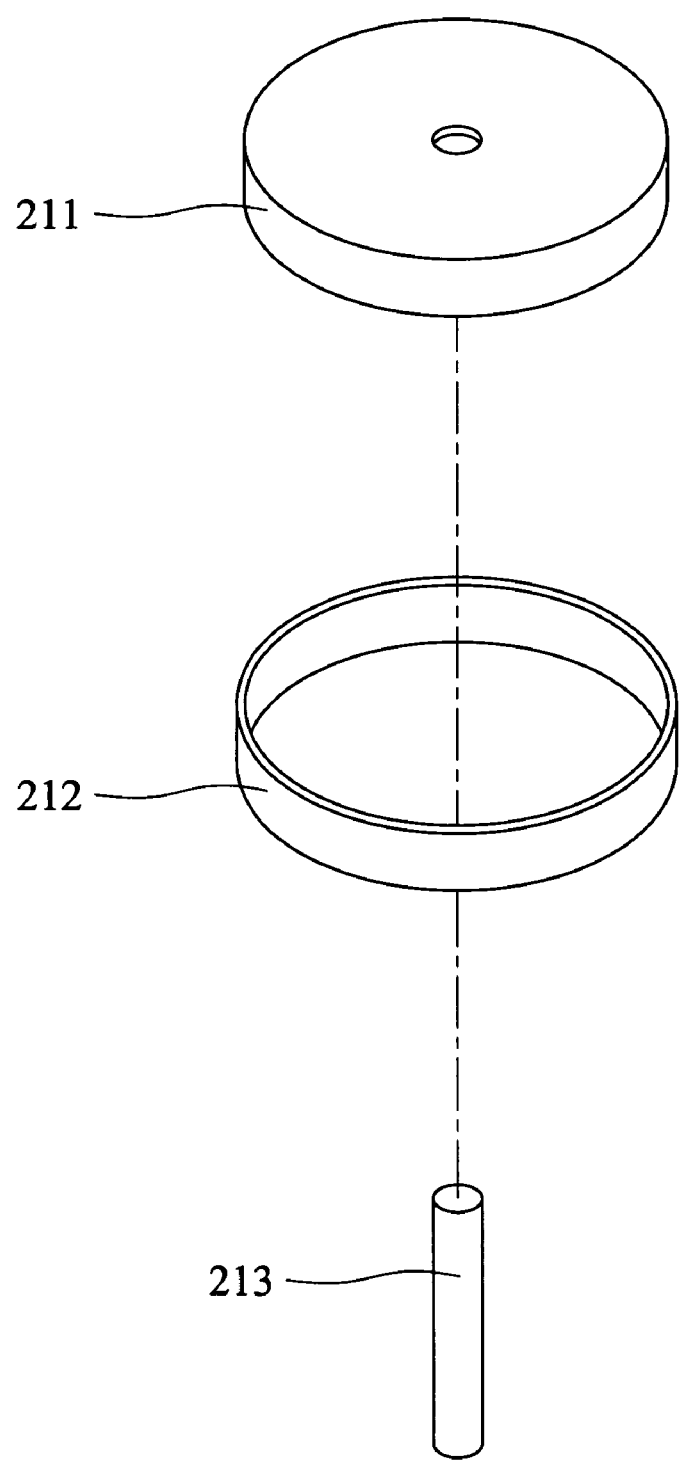
FIG. 2B is an exploded view of the rotor of the embodiment of according to FIG. 2A.
Figure 2C:
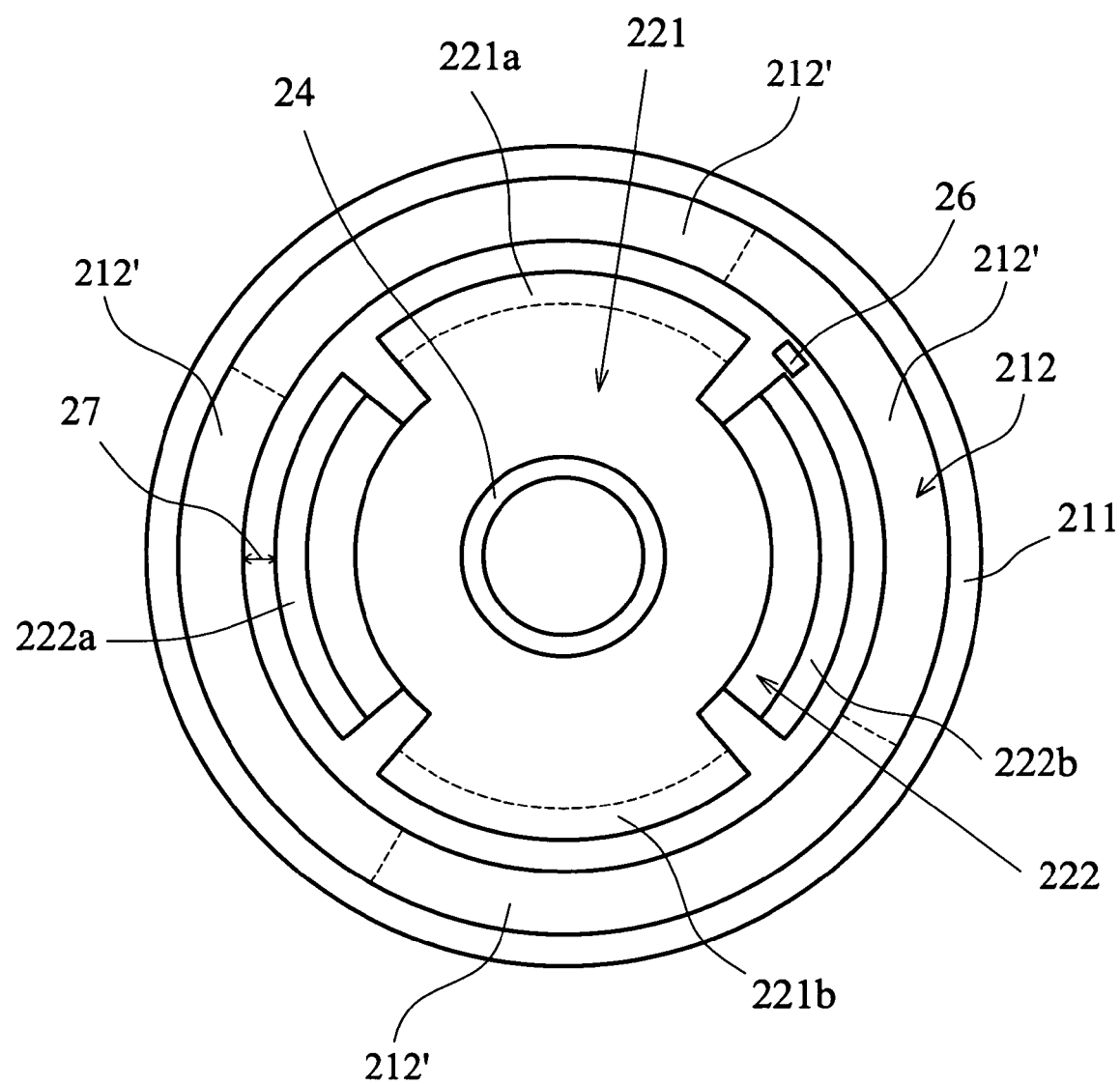
FIG. 2C is a top view of the embodiment of FIG. 2A after assembled.

In this present invention, the upper and lower stator parts 221 and 222 are integrally formed by injection molding or pressing a silicon steel plate. A uniform gap 27 is formed between the upper and lower stator parts 221 and 222 and the magnetic structure 212, as shown in FIG. 2C. The upper and lower stator parts 221 and 222 can be manufactured with the same mold, to reduce costs.

Figure 2D:
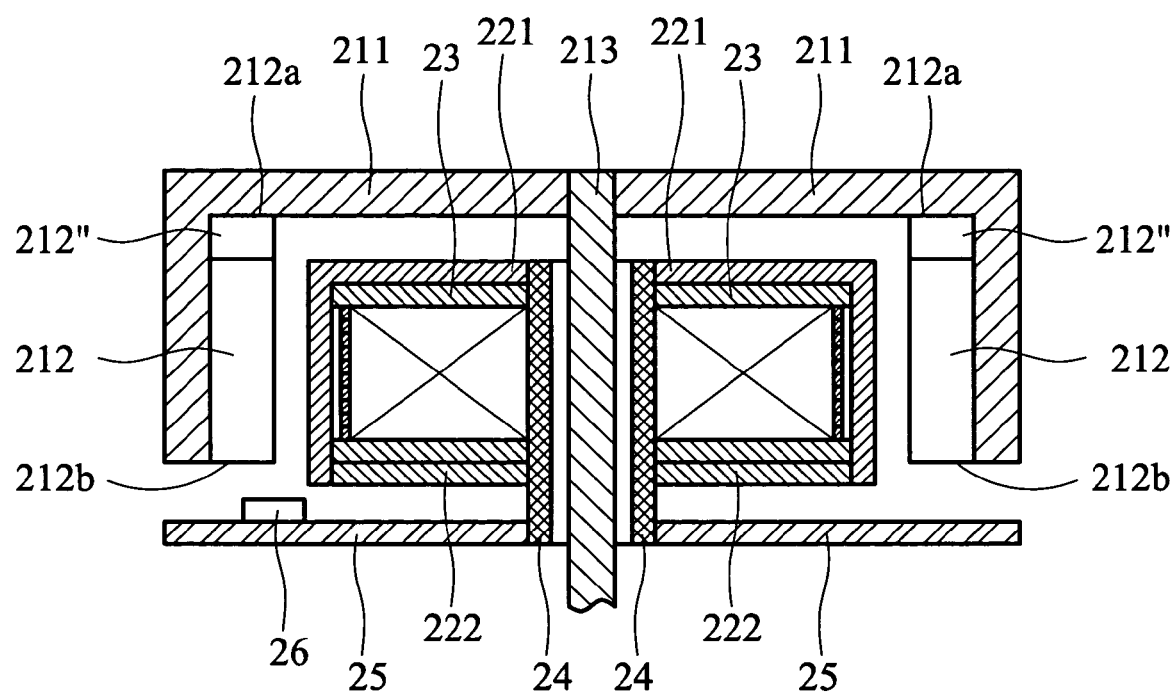
FIG. 2D is a sectional view of the embodiment of FIG. 2A after assembled.
Figure 3A:
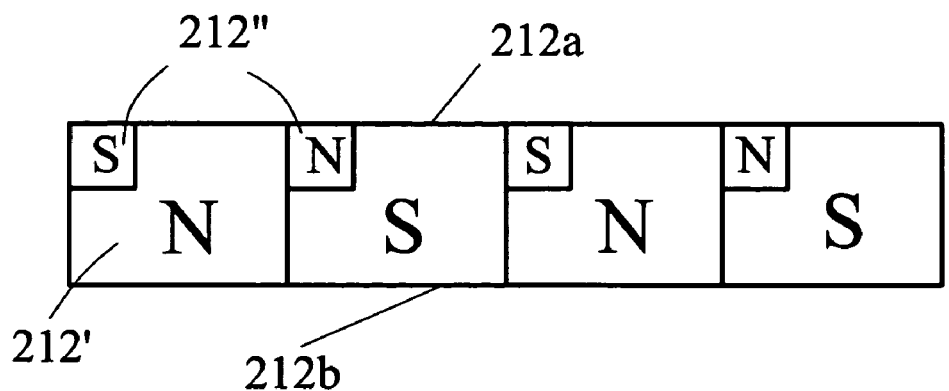
FIG. 3A is a schematic view of an interpolar portion and its profile and a magnetic distribution of a magnetic structure of an embodiment of a motor.
Figure 3B:
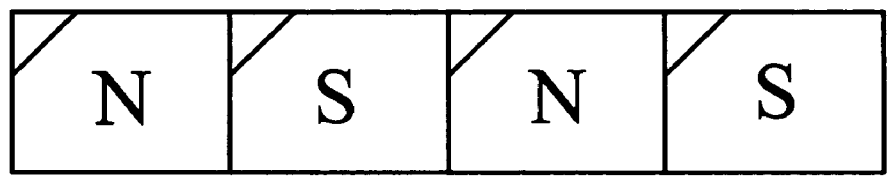
FIG. 3B is a schematic view of an interpolar portion and its profile and a magnetic distribution of a magnetic structure of an embodiment of a motor.
Figure 3C:
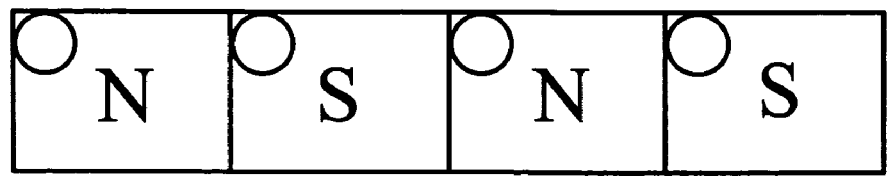
FIG. 3C is a schematic view of an interpolar portion and its profile and a magnetic distribution of a magnetic structure of an embodiment of a motor.

The magnetic structure 212 of the rotor 21 is a cylindrical magnet or a magnetic ring. The magnetic structure 212 comprises a plurality of magnetic regions. Each magnetic region has an interpolar portion. The reluctance of the magnetized magnet (magnetic structure) is substantially equal to 1, same as air, effectively reducing the vibration and noise of the motor during operation. The magnetic region 212' and the interpolar portion 212" can be counter (reverse) magnetized as shown in FIG. 3A. For example, the magnetic region 212' is magnetized to the N pole, and the interpolar portion 212" is magnetized to the S pole. Alternatively, the interpolar portion 212" is non-magnetizing portion as shown in FIG. 3B or a cavity portion as shown in FIG. 3C. The profile of the interpolar portion in the magnetic structure 212 may be rectangular, triangular, circular, or any other profile. Referring to FIG. 2D and FIG. 3A, the interpolar portions 212" are positioned opposite to the induction surface 212b of the magnetic structure 212, such as at the opposite sides near the surface 212a. Namely, the interpolar portions 212" are located at the corners of the magnet (magnetic structure 212) on its upper side, and the Hall sensor 26 is disposed on the lower side of the magnetic structure 212 which has no interpolar portions, as shown in FIG. 2D.

A motor of another embodiment of the invention is described in the following. Descriptions of elements using the same reference numbers are omitted.

Figure 4:
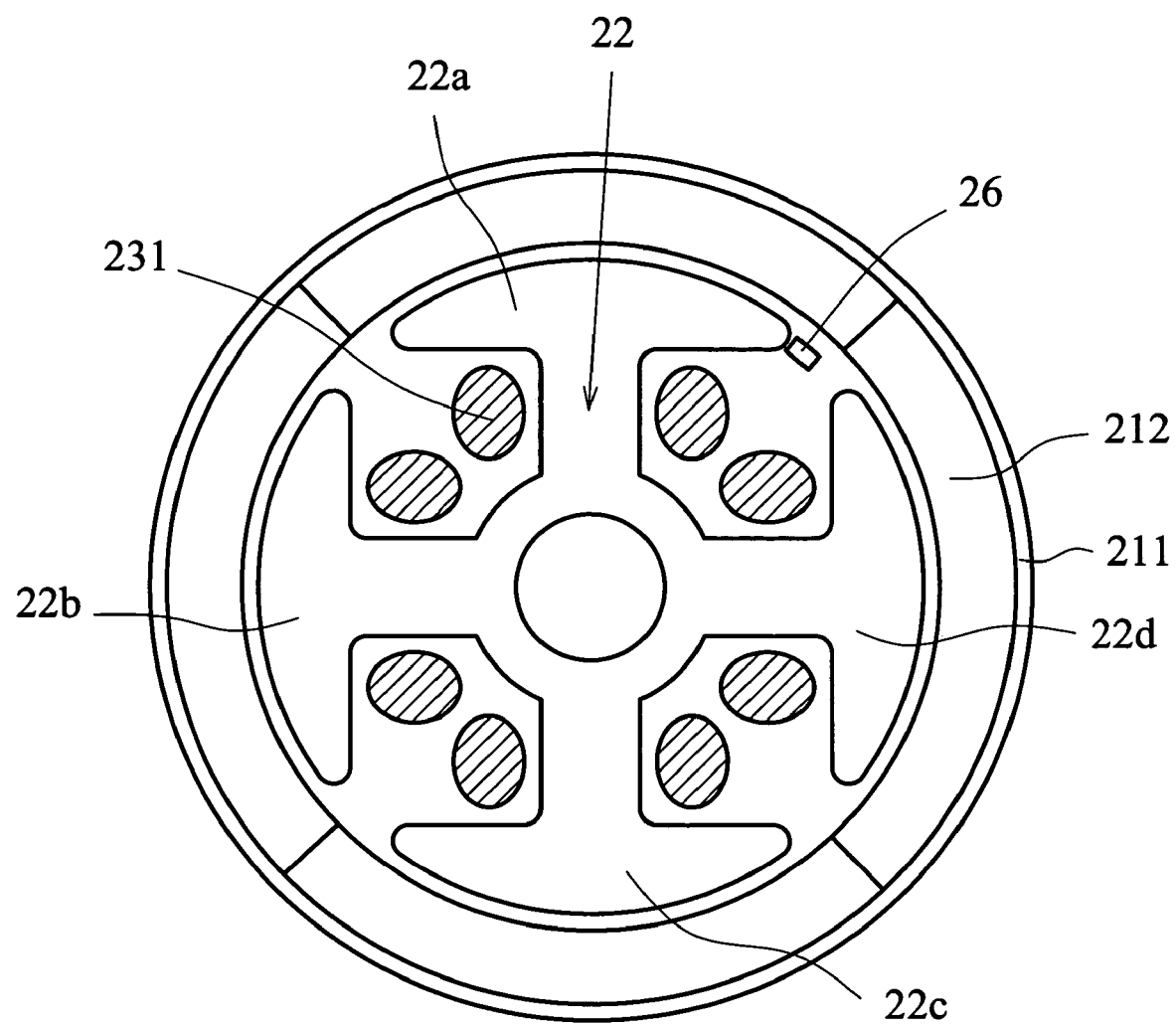
FIG. 4 is a sectional view of a motor of the second embodiment.

In FIG. 4, the stator 22 comprises a plurality of identical silicon steel plates with symmetrical magnetic poles 22a, 22b, 22c, and 22d. The silicon steel plates are stacked together. The winding 231 is wound around the magnetic poles 22a, 22b, 22c, and 22d. Namely, the stator 22 comprises the stacked silicon steel plates which have the same symmetric profile and are made by the same mold, thus, manufacturing cost, time, and difficulty may be reduced. Similarly, an uniform gap is formed between the magnetic poles 22a, 22b, 22c, and 22d and the magnetic structure 212.

In a single-phase motor, the sum of the exciting torque and the cogging torque is equal to the total torque (operating torque). The formula follows.

$$T_{torque} = T_{exciting} + T_{cogging}.$$

The motor design is based on the above formula. When the cogging torque $T_{cogging}$ is greater than the friction torque $T_{friction}$, the motor returns to the original position via the cogging torque. When the exciting torque $T_{exciting}$ is greater than the sum of the cogging torque $T_{cogging}$ and the friction torque $T_{friction}$, the motor can smoothly start. In this situation, the reluctance is unbalanced due to the cogging torque ($T_{cogging}$).

A formula showing the above description is $$T_{cogging} = -\frac{1}{2}(\phi_g)^2 (dR/d\theta) \qquad (a)$$

$\phi_g$ is total flux generated by the magnet (magnetic structure) of the rotor.

$dR/d\theta$ is gradient or rate of change of reluctance during motor rotation along the direction $\theta$.

As shown in formula (a), decreasing the gradient of reluctance during motor rotation along the direction $\theta$ may efficiently reduce the cogging torque of the motor and the vibration and noise during motor rotation. The embodiments of the invention utilize the uniform gap between the magnetic structure and the stator and the magnetic structure with interpolar portions to decrease the cogging torque caused by the unbalanced reluctance like the prior art.

While the invention has been described by way of example and in terms of preferred embodiments, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motor, comprising:
    a stator comprising a plurality of magnetic poles;
    a rotor coupled to the stator and comprising a magnetic structure comprising a plurality of magnetic regions, wherein each magnetic region comprises an interpolar portion for easily starting the motor; and
    a Hall sensor detecting the phase change of the magnetic poles, wherein the interpolar portion is located on a side of the magnetic structure corresponding to an induction surface opposite to the Hall sensor positioned on the other side of the magnetic structure, wherein a uniform gap is formed between the magnetic structure and the plurality of magnetic poles.

2. The motor as claimed in claim 1, wherein the magnetic region is counter magnetized with respect to the interpolar portion therein.

3. The motor as claimed in claim 1, wherein the interpolar portion is non-magnetizing or cavity portion.

4. The motor as claimed in claim 1, wherein the shape of the interpolar portion is shaped as rectangular, triangular, or circular.

5. The motor as claimed in claim 1, wherein the interpolar portion is located at outer corner of the magnetic structure.

6. The motor as claimed in claim 1, further comprising a winding, wherein the stator further comprises a plurality of stacked silicon steel plates with symmetrical magnetic poles, and the winding is wound on the magnetic poles of the stacked silicon steel plates.

7. The motor as claimed in claim 1, further comprising a winding base, wherein the stator further comprises an upper stator part and a lower stator part coupled with the upper stator part for allowing the winding base to be sandwiched therebetween.

8. The motor as claimed in claim 7, wherein the upper and lower stator parts are integrally formed by injection molding or pressing, and the magnetic poles are formed on the upper and lower stator parts.

9. The motor as claimed in claim 1, wherein the rotor further comprises a shell and a shaft and the magnetic structure is disposed in the shell.

10. The motor as claimed in claim 1, wherein the magnetic structure is a cylindrical magnet or magnetic ring.

11. A motor, comprising:
   a stator;
   a rotor coupled to the stator and comprising a magnetic structure with a plurality of magnetic regions and a plurality of interpolar portions; and
   a Hall sensor detecting the phase change of magnetic poles of the motor, wherein the interpolar portions and the Hall sensor are disposed on the opposite sides of the magnetic structure.

12. The motor as claimed in claim 11, wherein the magnetic regions and the interpolar portions are counter magnetized.

13. The motor as claimed in claim 11, wherein the interpolar portions are non-magnetizing or cavity portions.

14. The motor as claimed in claim 11, wherein the shape of the interpolar portions are rectangular, triangular, or circular.

15. The motor as claimed in claim 11, wherein the interpolar portions are located at outer corner of the magnetic structure.

16. The motor as claimed in claim 11, further comprising a winding, wherein the stator further comprises a plurality of stacked silicon steel plates with symmetrical magnetic poles, and the winding is wound on the magnetic poles of the stacked silicon steel plates.

17. The motor as claimed in claim 11, further comprising a winding base, wherein the stator further comprises an upper stator part and a lower stator part coupled to the upper stator part for enabling the winding base to be sandwiched therebetween.

18. The motor as claimed in claim 17, wherein the upper and lower stator parts are integrally formed by injection molding or pressing, and magnetic poles are formed on the upper and lower stator parts.

19. The motor as claimed in claim 11, wherein a uniform gap is formed between the stator and the magnetic structure.

* * * * *